United States Patent Office 3,393,065
Patented July 16, 1968

3,393,065
METHOD OF CONTROLLING WEEDS IN SOIL
Robert J. Dowling and Adam Soboleski, Naugatuck, Conn., assignors to United States Rubber Company, New York, N.Y., a corporation of New Jersey
No Drawing. Filed Apr. 21, 1964, Ser. No. 361,568
6 Claims. (Cl. 71—115)

This invention relates to improvements in sodium N-1-naphthylphthalamate herbicidal compositions.

Sodium N-1-naphthylphalamate is sold as a commercial herbicidal concentrate in about 24% aqueous solution for dilution and application to the soil as a pre-emergence herbicide. Generally the dilute solution of sodium N-1-naphthylphthalamate will be applied to the soil after seeding the agronomic crop and before emergence of weeds at a rate of about 1 to 10 pounds of the sodium N-1-naphthylphthalamate in 50 to 100 gallons of water per acre.

A basis for the action of preemergence herbicides is the difference in depth between the planted crop seeds and the weed seeds on the surface of the soil. Crop seeds are generally planted one to three inches deep and are somewhat protected from chemicals applied to the soil surface, while weed seeds generally germinate only in the one-fourth inch of soil and are thus subject to much higher concentrations of the chemical during the germination period. To maintain as high a concentration of herbicide as possible near the soil surface, and also to avoid injury to the seeded crop which may be semi-sensitive to the herbicide, it is desirable to minimize downward movement of the chemical in the soil during rains or irrigation. Sodium N-1-naphthylphalamate which is very soluble will, after its application to the soil and generally drying, readily dissolve again under rain and irrigation conditions and the solution will leach into the soil with the possibility of coming in contact with the seeded crop and injuring the same.

The purpose of the invention is to decrease the soil mobility of the sodium N-1-naphthylphthalamate herbicide, in order to increase residual weed control by maintaining a high concentration of the herbicide at the soil surface under wet conditions, and to minimize possible injury to the more deeply seeded crops.

It has now been found that formulating aqueous herbicidal concentrate solutions of sodium N-1-naphthylphthalamate with ammonium oleate or a volatile amine soap of oleic acid greatly reduces the tendency of sodium N-1-naphthylphthalamate to leach after application to the soil surface as conventionally diluted solutions. The volatile amines that may be used to prepare the volatile amine soaps are morpholine and the primary, secondary and tertiary alkylamines in which the alkyl radicals have 1 to 3 carbon atoms, i.e. mono- di- and trimethylamines, mono-di- and triethylamines, mono-, di- and tripropylamines, and mono-, di- and triisopropyl amines. The amount of ammonium or volatile amine oleate soap is not critical and may be in amount equivalent to 0.1 to 1 part of the oleate radical portion of the soap per part of the sodium N-1-naphthylphthalamate. An excecss of ammonia or volatile amine will generally be used in forming the soap in situ in the concentrate formulation. The content of sodium N-1-naphthylphthalamate in the concentrate is not critical and will generally be from 25 to 60 parts per 100 parts of water. A small amount of surface-active wetting agent, generally less than 1% of the concentrate formulation may be included, if desired.

The following example illustrates the invention. All parts and percentages referred to herein are by weight.

An approximately 24% aqueous solution of sodium N-1-naphthylphthalamate acid was used as a control concentrate. Concentrate A according to the present invention was an aqueous solution containing about 24% of sodium N-1-naphthylphthalamate, 2% of monoethylamine and 4% of oleic acid (i.e. about 70% water). Concentrate B according to the present invention was an aqueous solution containing about 24% of sodium N-1-naphthylphthalamate, 5% of monoethylamine and 10% of oleic acid. Concentrate C according to the present invention was an equeous solution containing about 24% of sodium N-1-naphthylphthalamate, 10% of monoethylamine and 20% of oleic acid.

The reduction in the leaching in soil of the sodium N-1-naphthylphthalamate from the concentrates A, B and C according to the present invention as compared with the control concentrate is shown in the following test. In the test, the concentrates were diluted to about 1 part of the sodium N-1-naphthylphthalamate per 1000 parts of water. The solutions were watered on the surface of 1″ thick layers of mixtures of sand with soils from various regions in separate Buchner type funnels in amount corresponding to an application rate of about 4 lbs. of sodium N - 1 - naphthylphthalamate per acre. An hour after treatment of the soil samples with the dilute herbicide solutions from the control concentrate and from the concentrates A, B and C (the time was found not to be critical), an amount of water equivalent to 1 inch rainfall was applied to the soil surfaces. The moisture content of the soil was reduced to field capacity by gravity and subsequent vacuum filtration. The filtrates were analyzed to determine the amount of sodium N-1-napthylphthalamate removed. The percentage of the applied sodium N-1-naphthylphthalamate washed through 1 inch of soil by water equivalent to 1 inch of rainfall (i.e. percent leached) was then calculated with results shown in the following table:

| Soil Source | Percent Leached | | | |
|---|---|---|---|---|
| | Control | A | B | C |
| Bethany, Conn | 37 | 24 | 20 | 23 |
| Bragg, Tenn | 70 | | 32 | 32 |
| Wright, Tenn | 68 | | 28 | 21 |

These data show definite improvement with respect to the percent sodium N-1-naphthylphthalamate leached through the soil, thereby decreasing the possibility of crop injury.

Having thus described our invention, what we claim and desire to protect by Letters Patent is:

1. A method of controlling weeds in soil which comprises applying to the soil before emergence of weeds an aqueous solution containing a herbicidal effective amount of sodium N-1-naphthylphthalamate and an oleate soap selected from the group consisting of ammonium oleate, morpholine oleate, and primary, secondary and tertiary alkylamine oleates in which the alkyl radicals have 1 to 3 carbon atoms.

2. The method of controlling weeds in soil which comprises applying to the soil before emergence of weeds an aqueous solution containing a herbicidal effective amount of sodium N-1-naphthylphthalamate and an oleate soap selected from the group consisting of ammonium oleate, morpholine oleate, and primary, secondary and tertiary alkylamine oleates in which the alkyl radicals have 1 to 3 carbon atoms, the oleate soap being in amount equivalent to 0.1 to 1 part of the sodium N-1-naphthylphthalamate.

3. The method of controlling weeds in soil which comprises applying to the soil before emergence of weeds an aqueous solution containing sodium N-1-naphthylphthalamate and an oleate soap selected from the group consisting of ammonium oleate, morpholine oleate, and primary, secondary and tertiary alkylamine oleates in which the alkyl radicals have 1 to 3 carbon atoms, the oleate soap being in amount equivalent to 0.1 to 1 part to the oleate radical portion per part of the sodium N-1-naphthylphthalamate, and the aqueous solution being applied at a rate of about 1 to 10 pounds of the sodium N-1-naphthylphthalamate in 50 to 100 gallons of water per acre.

4. The method of controlling weeds in soil which comprises applying to the soil before emergence of weeds an aqueous solution containing a herbicidal effective amount of sodium N-1-naphthylphthalamate and monoethylamine oleate.

5. The method of controlling weeds in soil which comprises applying to the soil before emergence of weeds an aqueous solution containing a herbicidal effective amount of sodium N-1-naphthylphthalamate and monoethylamine oleate, the monoethylamine oleate being in amount equivalent to 0.1 to 1 part of the oleate radical portion per part of the sodium N-1-naphthylphthalamate.

6. The method of controlling weeds in soil which comprises applying to the soil before emergence of weeds an aqueous solution containing sodium N-1-naphthylphthalamate and monoethylamine oleate, the monoethylamine oleate being in amount equivalent to 0.1 to 1 part of the oleate radical portion per part of the sodium N-1-naphthylphthalamate, and the aqueous solution being applied at a rate of about 1 to 10 pounds of the sodium N-1-naphthylphthalamate in 50 to 100 gallons of water per acre.

References Cited
UNITED STATES PATENTS

| | | | |
|---|---|---|---|
| 2,556,665 | 6/1951 | Smith et al. | 71—2.6 |
| 2,736,647 | 2/1956 | Smith et al. | 71—2.6 |
| 3,220,823 | 11/1965 | Mihara et al. | 71—2.7 |

JAMES O. THOMAS, JR., *Primary Examiner.*

LEWIS GOTTS, ELBERT L. ROBERTS, *Examiners.*

UNITED STATES PATENT OFFICE
CERTIFICATE OF CORRECTION

Patent No. 3,393,065                             July 16, 1968

Robert J. Dowling et al.

It is certified that error appears in the above identified patent and that said Letters Patent are hereby corrected as shown below:

In the heading to the printed specification, lines 4 and 5, "United States Rubber Company, New York, N. Y.," should read -- Uniroyal, Inc., --.

Signed and sealed this 16th day of December 1969.

(SEAL)
Attest:

Edward M. Fletcher, Jr.                      WILLIAM E. SCHUYLER, JR.
Attesting Officer                              Commissioner of Patents